United States Patent [19]

Fenwick et al.

[11] Patent Number: 5,148,889
[45] Date of Patent: Sep. 22, 1992

[54] HIGH LEVEL PACKAGE RETRIEVAL SYSTEM

[75] Inventors: Jay G. Fenwick, Albert Lea; Jay R. Stemler, Jr., Owattona, both of Minn.

[73] Assignee: Joyce/Streater Inc., Albert Lea, Minn.

[21] Appl. No.: 768,165

[22] Filed: Sep. 30, 1991

[51] Int. Cl.$^5$ ............................................. E06C 1/397
[52] U.S. Cl. .......................................... 182/17; 182/39; 182/115
[58] Field of Search ...................... 182/39, 36, 115, 12, 182/15, 17

[56] References Cited

U.S. PATENT DOCUMENTS

| | | | |
|---|---|---|---|
| 356,375 | 1/1887 | Perkins | 182/39 |
| 714,913 | 12/1902 | Keen . | |
| 1,388,047 | 8/1921 | Jones . | |
| 1,432,116 | 10/1922 | Martin | 182/39 |
| 2,551,345 | 5/1951 | Scott | 189/43 |
| 2,894,641 | 7/1959 | Edwards, Jr. | 211/134 |
| 2,985,253 | 5/1961 | Hollingsworth | 182/17 |
| 3,283,851 | 11/1966 | Smith | 182/115 |
| 3,434,566 | 3/1969 | Miller | 182/115 |
| 3,687,239 | 8/1972 | Moehlenpah et al. | 188/43 |
| 3,729,062 | 4/1973 | Freiburger | 182/39 |
| 3,756,433 | 9/1973 | Richins | 214/16.4 A |
| 3,808,693 | 5/1974 | Plasser | 33/144 |
| 3,945,510 | 3/1976 | Saul, Jr. et al. | 214/16.4 A |
| 3,982,639 | 9/1976 | Haldimann et al. | 214/16.4 C |
| 4,232,759 | 11/1980 | Jacobs | 182/39 |
| 4,971,168 | 11/1990 | Stanescu | 182/1 |

Primary Examiner—Reinaldo P. Machado
Attorney, Agent, or Firm—Jacobson & Johnson

[57] ABSTRACT

A new and improved overhead package retrieval system, including a series of C-shaped tracks which are mounted onto storage shelf units, a platform that has rollers that fit within these C-shaped tracks and allow the platform to move, a special jointed retractable axle system which allows the platform to move along the tracks even if they are not completely parallel, a fold-up ladder for a user to get from ground to platform level, a special brake that operates when fold-up ladder is down to prevent movement of the platform, a package platform that allows a user to easily move packages from the platform to the ground, and a series of guard rails and hand rails to make the overhead package retrieval system safe.

11 Claims, 4 Drawing Sheets

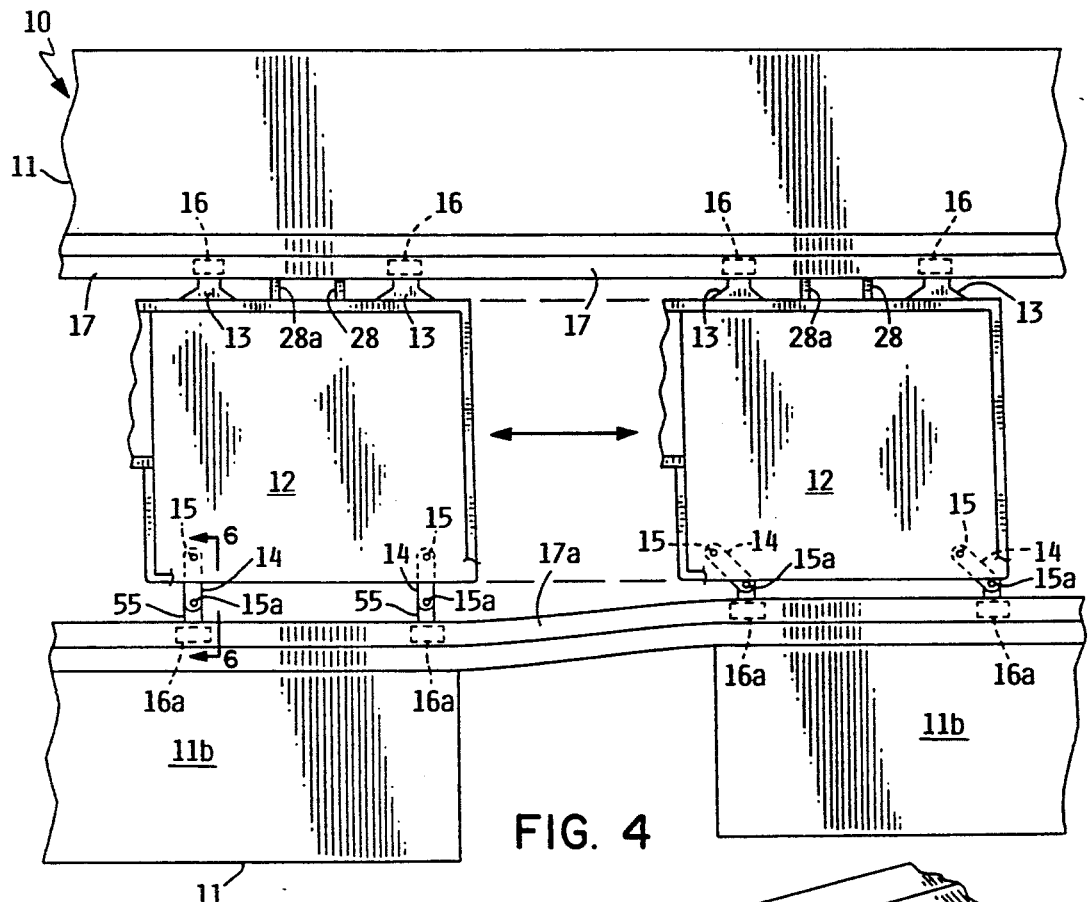
FIG. 4
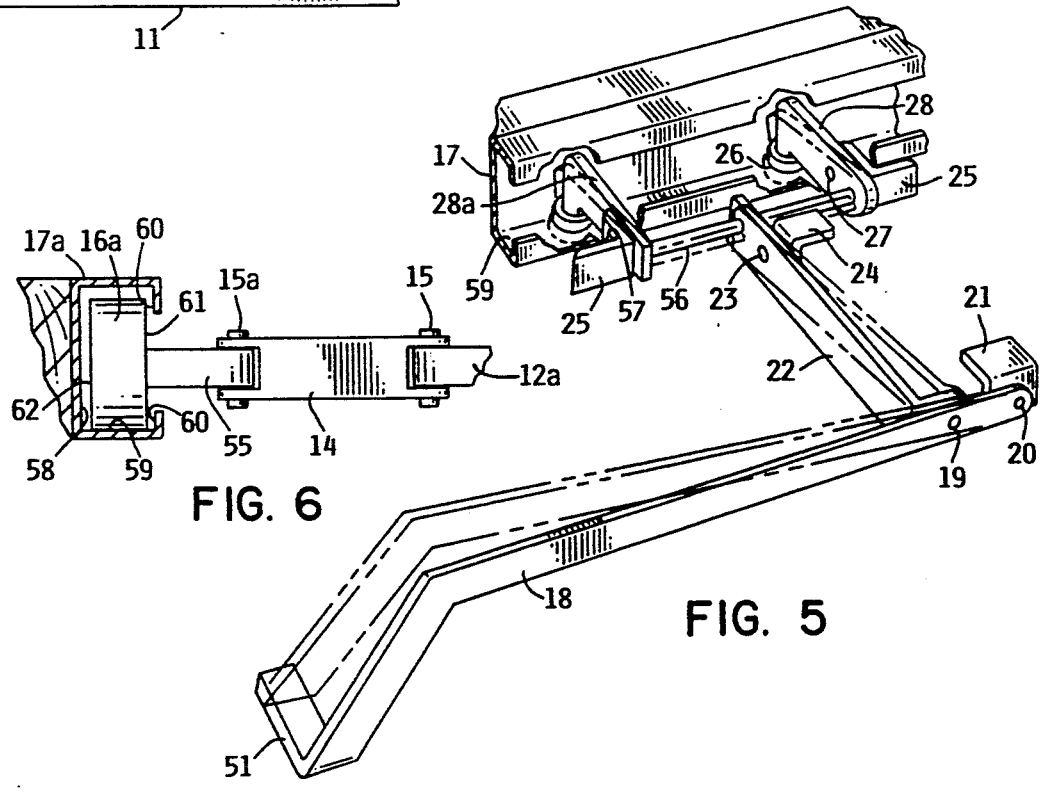
FIG. 6
FIG. 5

HIGH LEVEL PACKAGE RETRIEVAL SYSTEM

BACKGROUND OF THE INVENTION

Most large retail stores have a storage room where they store products that they don't put on the front shelves due to lack of space on the shelves in the retail area. These storage room shelves are ten, often fifteen feet high, sometimes even higher. When workers remove large, heavy, bulky packages from the top shelves unassisted or using only a ladder, they can fall and get hurt. When an employee gets hurt it not only means suffering for the employee, but suffering for the company or store who is responsible for the workers injuries.

Another dangerous way of getting a package off an overhead shelf is shown in U.S. Pat. No. 2,894,641, where a worker must carry a heavy platform to the desired site, and then use a separate ladder to get to the platform, put up with the risk of having the ladder, platform or both slip while climbing, and once on the platform, still having to go down a ladder carrying a heavy package, unless it is thrown.

Another prior art method shown in U.S. Pat. No. 3,756,433 requires a separate stacker crane to get the packages placed at high levels. Stacker cranes need fuel, produce waste, require skills to operate, and are very noisy.

An object of this invention is to provide a safe, cost-effective way of getting packages from overhead areas down without hurting workers.

Another object of this invention is to make a platform that is safe to climb on and also has a safe way of bringing a package to ground level without requiring a worker to carry it down a ladder.

Another object of this invention is to create a safe, sturdy, useable platform that does not produce waste, require fuel, cause excessive noise pollution and requires very minimal skill to use.

Still another object of this invention is to provide a safe, sliding platform that can be used even if its supports are not completely parallel, providing typically a leeway space of between four to six inches from center either way.

Another object of this invention is to create a platform that cannot come off of its tracks and cause harm to a worker.

DESCRIPTION OF THE PRIOR ART

U.S. Pat. No. 2,894,641 is a storage rack designed to be used with a lift truck to remove items from overheads.

U.S. Pat. No. 3,756,433 is a material handling system which uses a vehicle to remove carts which are hanging from girders.

U.S. Pat. No. 3,808,693 is a mobile track gage surveying device which measures the changing widths on railroad tracks and adjusts accordingly.

U.S. Pat. No. 714,913 is a brake for electric cars which is engaged by a lever mechanism.

U.S. Pat. No. 2,551,345 is a stairway which folds up into a convenient size for carrying.

U.S. Pat. No. 1,388,047 is a brake designed for use by railroad cars which utilizes compressed air to perform its function.

U.S. Pat. No. 3,687,239 is a carriage which has clamps that can hydraulically secure the carriage to the track.

U.S. Pat. No. 3,982,639 is a shelf storage system where boxes are stored on four wheeled carts and then wheeled on to an elevator to be lowered to ground level.

U.S. Pat. No. 4,232,759 is a moveable scaffolding system which has a scaffold that latches on to two ladders, the ladders having wheels at the bottom to allow easy movement of the scaffolding.

U.S. Pat. No. 4,971,168 is a swing out ladder system with swing up steps that allows for easy access to boats and the like.

U.S. Pat. No. 2,985,253 is an adjustable scaffolding system which has few supports, thus taking up little space where it is secured.

U.S. Pat. No. 3,945,510 is a storage system where a wheeled dolly is lifted by an outrigger to a position on a standing frame and then attached.

BRIEF DESCRIPTION OF THE DRAWINGS

FIG. 4 is a top view of the overhead package retrieval system showing in detail the jointed retractable axle system.

FIG. 5 is a pictorial view of the platform brake for the overhead package retrieval system.

FIG. 6 is a side sectional view of the C-shaped rail along which the rollers run inside.

BRIEF DESCRIPTION OF THE INVENTION

This invention relates generally to the field of safely removing large items such as boxes and the like from high areas and bringing them to ground level without harming the worker. In the present invention, a user may simply roll the raised platform along the tracks to the desired location, lower the ladder, thus automatically activating the safety brake and using the hand rails, climb the ladder to the platform. Once there, a worker needs simply to lift a package from the shelf of the storage unit and take it down the ladder or set it on to the package platform, where it can be lowered to the ground mechanically. Then, the worker need simply to climb down and exert a little upward force on the ladder, for the built in gas charged lifter will do the rest of the work to raise the ladder to its upper position and release the brake so that the worker can move the platform to another location and retrieve another package.

DESCRIPTION OF THE PREFERRED EMBODIMENT

Figure 1:
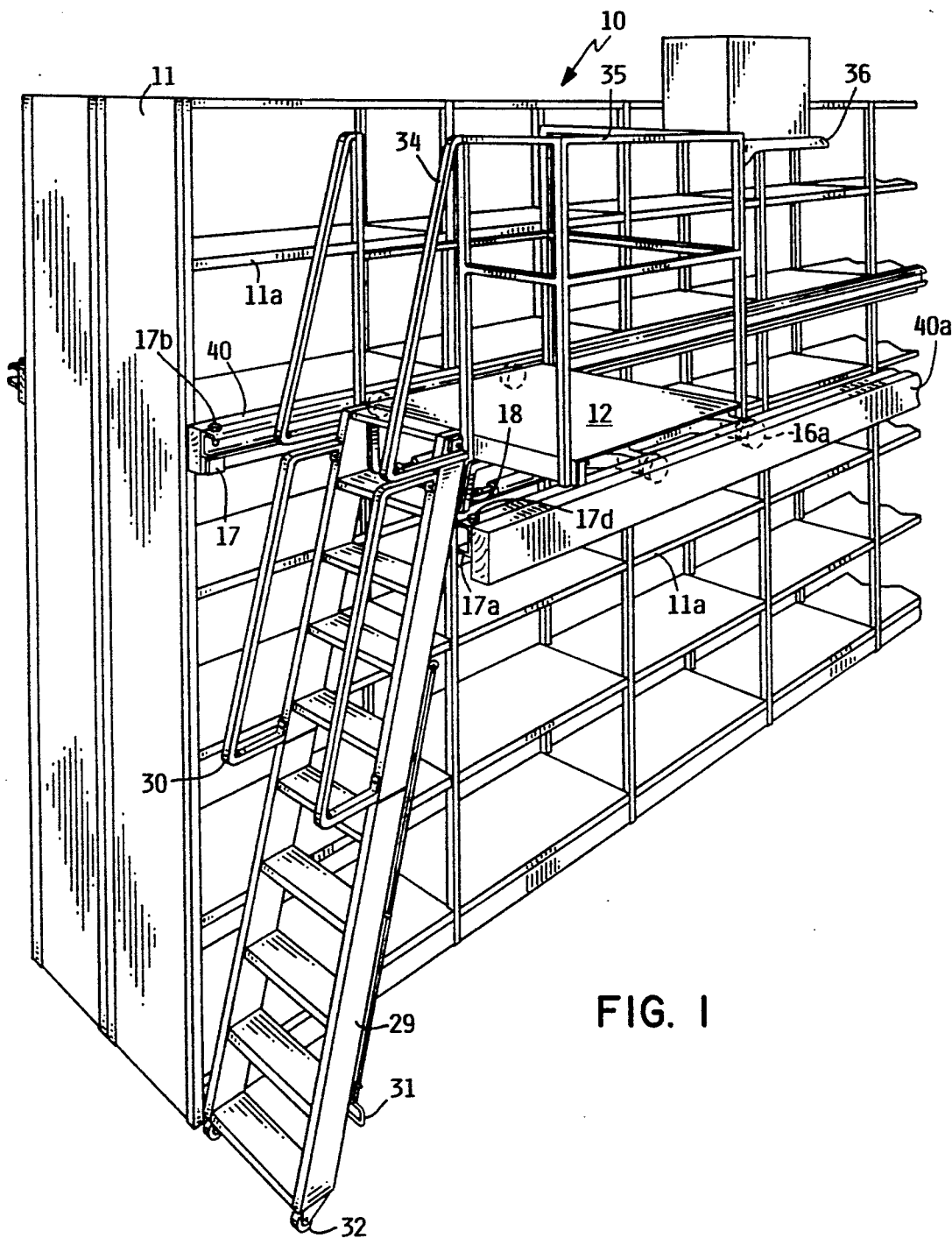
FIG. 1 is a pictorial view of the overhead package retrieval system with one shelving unit not being shown.
Figure 2:
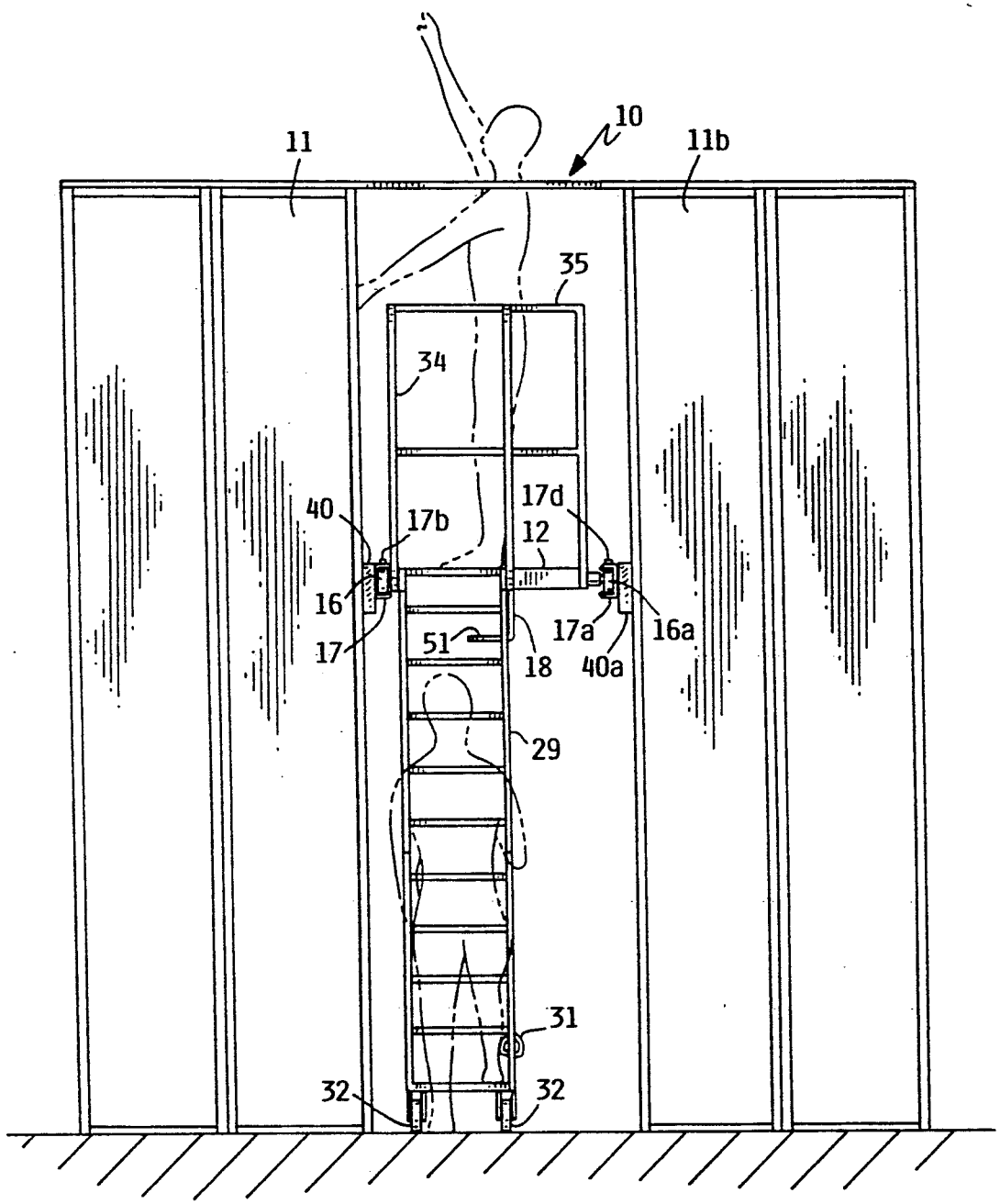
FIG. 2 is a side elevation view of the overhead package retrieval system in use by two workers, one climbing the ladder, the other on the platform, with the brake engaged.

FIG. 1 and FIG. 2 illustrate the overhead package retrieval system 10. The overhead package retrieval system 10 has been designed to operate between two parallel or non-parallel shelving units 11 and 11b which contain a plurality of shelves 11a. A first base member 40 is attached to the inside of shelving unit 11 at a height of at least 6 feet from the ground. Further attached to first base member 40 is a C-shaped track 17 having a roller stop 17b. Attached to a second base member 40a is a second C-shaped track 17a. One side of a platform 12 is rollingly supported by a set of two rollers 16 and the other side of platform 12 is rollingly supported by a set of two rollers 16a (FIG. 4). Rollers 16a included retractable supports that permit platform 12 to move between shelving units 11 and 11b even though the tracks may be located in a non-parallel relationship. Two rollers 16 roll inside one C-shaped track 17 and two rollers 16a with retractable supports roll inside another C-shaped track 17a. A stop 17b projects downwards through C-shaped tracks 17 to prevent rollers 16 from rolling off the ends of C-shaped tracks 17. Similarly, a stop 17c projects downwards through C-shaped tracks 17a to prevent rollers 16a from rolling off the ends of C-shaped tracks 17a.

Attached to platform 12 is a platform guard rail 35 which is used as a safety device to prevent users from falling.

Also attached to platform 12 and extending to the floor is a fold-up ladder 29 which allows a user to climb from the floor to platform 12. Fold-up ladder 29 has a set of lower hand rails 30 to allow a user support when climbing fold-up ladder 29. A set of upper hand rails 34 allows the user safe support when traveling from fold-up ladder 29 to platform 12. At the base of fold-up ladder 29 are two self locking ladder casters which help to stabilize fold-up ladder 29 from moving about when a user is climbing or standing. Ladder casters include a brake pad (not shown) that prevents them from rolling once weight is placed on fold-up ladder 29. Fold-up ladder 29 includes intermediated hinges 50 that permits fold-up ladder 29 to fold to an up position and a pivot member 38 to permit one end of fold-up ladder 29 to pivot thereon as fold-up ladder 29 is moved from the up position to the down position or vice a versa.

Figure 3:
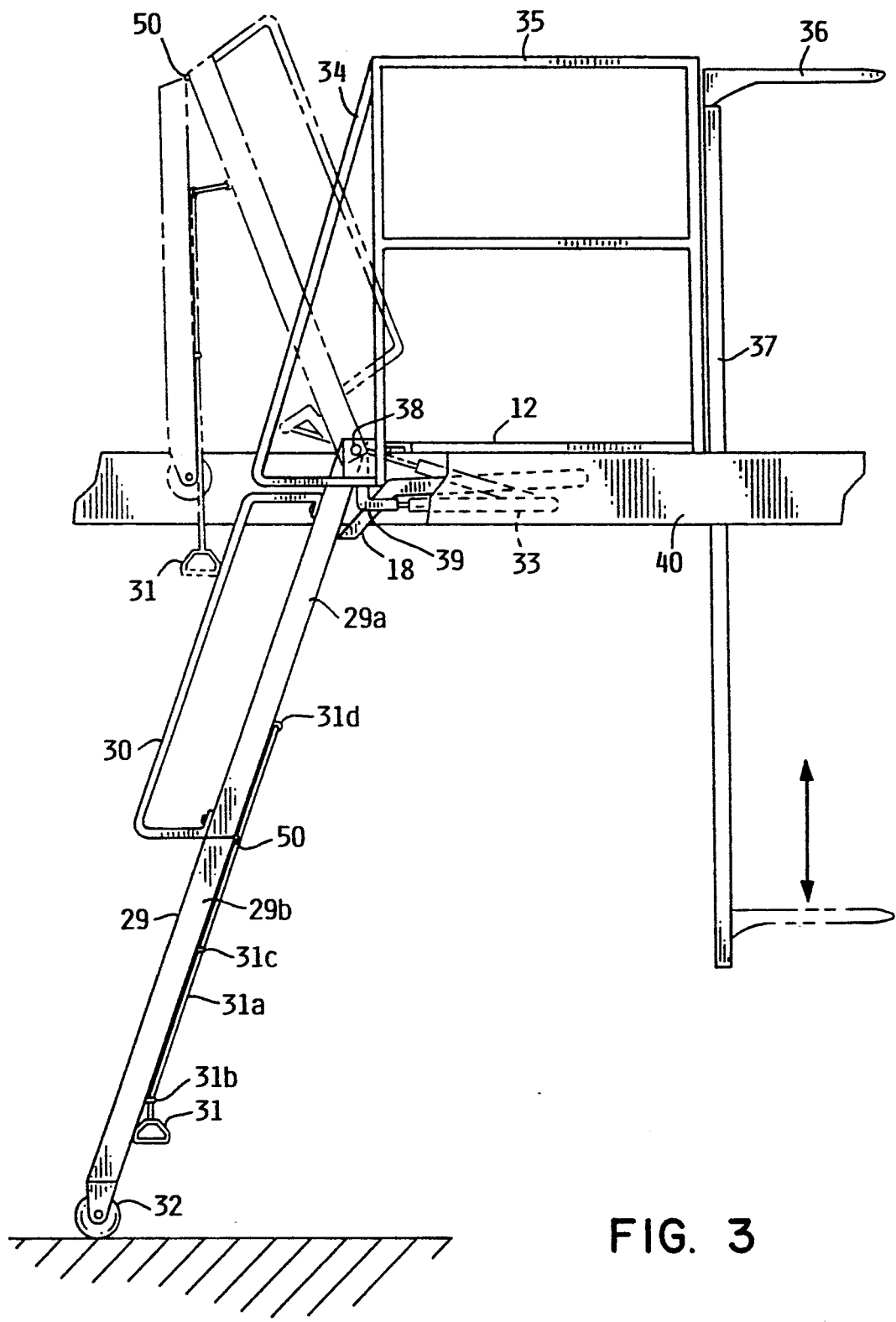
FIG. 3 is a side cut-away view of the overhead package retrieval system showing the fold-up stairway in both its raised and lowered position, and the package platform in the raised and lowered position.

FIG. 3 illustrates the up position (in dashed lines) and the down position of fold-up ladder 29. In order to lower fold-up ladder 29 from its raised position a user pulls down on a retractable hand grip 31 which lowers fold-up ladder 29. Retractable hand grip 31 connects to a cord 31a that slides in an eye bolt 31b and and eye bolt 31c located on lower ladder section 29b. Attached to upper ladder section 29a is an eye bolt 31d where the end of cord 31a is secured thereto. Eye bolts 31d and 31c are spaced approximately two feet from the hinge 50 between ladder sections 29a and 29b. The purpose of spacing the eye bolts 31d and 31c from the hinge 50 is to allow the hand grip to extend beyond the lower end of fold-up ladder 29 when fold-up ladder 29 is in the up position and to retract the retractable hand grip 31 when fold-up ladder 29 is in the lowered position.

A package platform 36 is attached to platform 12 which allows a user to place a package on package platform 36 and then lower it to ground level through a hydraulic cylinder 37, therefore eliminating the need of carrying packages down fold-up ladder 29.

FIG. 2 illustrates an end view of the overhead package retrieval system 10. Platform 12 has upper hand rails 34 attached to it to assist the person in climbing onto platform 12. One end of platform 12 is supported by rollers 16 which roll in C-shaped track 17. Similarly, the opposite side of platform 12 is supported by rollers 16a which roll inside of C-shaped track 17a. Fold-up ladder 29 is shown in its down or locked position. A platform brake arm 18 attachs to the bottom of platform 12 and includes a pedal 51 that engages fold-up ladder 29 when fold-up ladder 29 is in the lower position.

FIG. 3 is a side view of the overhead package retrieval system 10. Fold-up ladder 29 is shown in both its upright (in phantom lines) and lowered positions. Lowered fold-up ladder 29 pivots around a hinge 50 to allow fold-up ladder 29 to fold upwards. When in lowered position, fold-up ladder 29 can be easily raised to the upper position by means of a gas charged lifter 33 which takes much of the weight of fold-up ladder 29 off the hands of the user trying to lift fold-up ladder 29. That is, gas charged lifter 33 is pivotally attached to fold-up ladder 29 by means of an upper arm 39 which provides a counterclockwise torque to assists a user in raising fold-up ladder 29 from its lower position. When raised, fold-up ladder 29 can be easily lowered by a user simply grasping hand grip 31 and pulling down. Package platform 36 can be seen attached to platform 12.

FIG. 4 is a top view of the overhead package retrieval system 10 showing the mobile elevated platform 12 in two different locations between non-parallel sections of tracks. Two rollers 16 are attached to one side of platform 12 by means of a set of two fixed axles 13. Also on the same side of platform 12, are a pair of brake bars or members 28 and 28a that are located between axles 13. Brake bars or members 28 and 28a fit inside C-shaped track 17 to prevent movement of platform 12 as the user climbs fold-up ladder 29 or stands on platform 12. On the opposite side of platform 12, rollers 16a with retractable supports 14 are attached to platform 12 by means of a jointed retractable axle system. The purpose of the jointed retractable axle system is to compensate for non-parallel alignment of the tracks in 17 and 17a which results in different widths between the C-shaped tracks 17 and 17a.

FIG. 6 shows in greater detail the jointed retractable axle system with a horizontal axle 55 pivotally connected to one end of link 14 by vertically extending pivot pin 15a. Similarly, the opposite end of link 14 is secured to platform support 12a by a second vertical pivot pin 15. Rollers 16a (as well as end rollers 16) have a smooth surface which smoothly rolls upon a roller support surface 59, which is inside C-shaped rail 17a. Roller 16a moves back and forth inside the C-shaped rail 17a to compensate for the non-parallel alignment of the tracks. Rollers 16 include a smooth outer roller surface 62 and a smooth inner roller surface 61. The smooth outer roller surface 62 coacts with smooth surface 58 to allows roller 16a to freely slide against a lateral outer roller guide 58 so that the roller 16a can be pushed inward if the distance between the two tracks becomes narrower. Similarly, a smooth inner roller surface 61 coacts with smooth surface 60 on lateral inner roller guide 60 to allow roller 16a to pull the retractable support system outward as the tracks supporting the platform diverge. Each of the tracks have a generally closed C-shape with an elongated opening therein that has a dimension less than a diameter of the rollers so that said rollers remain captured in tracks to thereby maintain the elevated platform between track 17 and said track 17a.

FIG. 4 shows platform 12 (left side of FIG. 4) with the retractable supports in the extended position. As the platform is moved to the right the tracks 17 and 17a assume a non-parallel relationship. In order to prevent binding of the rollers and still allow for movement of platform 12 on tracks 17 and 17a the retractable support system for rollers 16a retracts (right side of FIG. 4) to allow platform 12 to pass between non-parallel support tracks.

FIG. 5 is an illustration of the braking mechanism on the overhead package retrieval system 10. The braking mechanism is mounted in platform 12. When fold-up ladder 29 is in its upper position or non braking position (dotted lines), brake arm 18 is in held in its upper position by a spring mechanism (not shown) to permit platform 12 to move freely along C-shaped tracks 17 and 17a. When fold-up ladder 29 is in its lowered position, fold-up ladder 29 presses down on pedal 51, which pulls down brake arm 18 (solid lines). This engages the braking mechanism, thereby preventing platform 12 from moving along C-shaped tracks 17 and 17a.

Platform brake mechanism includes an L-shaped brake attachment flange 21 which pivotally attaches brake arm 18 to bottom of platform 12 by a pivot pin 20. A second brake arm pivot pin 19 is located a few inches from pivot pin 20, and it attaches brake arm 18 to inner brake bar 22. When brake arm 18 is forced down (solid lines) by fold-up ladder step (shown in FIG. 1), brake arm 18 pivots around pivot pin 19 causing the attached end of inner brake bar 22 to move downwards as it pivots about pivot pin 23 attached to L-shaped flanged 24 attached to platform 12. When the end of inner brake bar 22 connected to pivot pin 19 moves downwards, the other end of inner brake bar 22 pivots around pivot pin 23 and moves upwards, raising a cross beam 56 along with it. Pivot pin 23 pivotally attaches inner brake bar 22 and secondary brake attachment piece 24 together. A pair of flanges 25 are attached to bottom of platform 12 to support pivotable brake bars 28 and 28a. Attached to flanges 25 by means of pivot pins (57, 27 respectively), are pivotal brake bars 28. When cross beam 56 moves upwards, it pivots brake bars 28 around pivot pins, (57, 27 respectively), causing ends of brake bars 28 located in C-shaped track 17 to move downwards. When brake bars 28 pivot downward, a pair of friction or brake pads 26 move downwards to engage track 17. The brake pads 26 are stationed within C-shaped track 17, in between two rollers 16 (FIG. 4). In summary, when fold-up ladder 29 moves into its lower positions, the brake linkage mechanism forces brake pads 26 to press against the inside of C-shaped rail 17 thereby prevent the platform 12 from rolling. The brake system is thus automatically activated when fold-up ladder 29 is lowered to ensure that the user does not not start to climb the platform 12 without the platform 12 being secured. Similarly, when fold-up ladder 29 is raised the platform brake mechanism is automatically deactivated to allow the user to freely move the platform 12 to a new location.

In summary if a user wants to remove a package from a high shelf and bring it to the ground. First, the user rolls platform 12 along C-shaped tracks 17 and 17a to the desired position. Next, the user pulls down on hand grip 31 which causes fold-up ladder 29 to come to the floor and also engage the braking mechanism. Next, the user climbs up fold-up ladder 29 and onto platform 12. Then, a user can either carry the package from the shelf 11a to the floor or set it onto the package platform 36, and then lower the package platform 36 to the ground. Then the user climbs down fold-up ladder 29 and raise fold-up ladder 29. Finally, the user takes package from lowered package platform 36.

We claim:

1. A mobile overhead package retrieval device to enable a user to move a retrieval platform from place to place along tracks mounted on a set of storage shelves to allow the user to safely retrieve packages from an overhead storage area on the storage shelves comprising:

a first and a second track located in a spaced relationship from each other, said first and said second track mountable on adjacently spaced storage shelves;

an elevated platform for supporting a user as the user removes a package from the storage shelf, said elevated platform including a set of rollers for rollingly supporting said elevated platform on said first and said second track to enable a user to move said elevated platform from place to place, said elevated platform including a retractable support for supporting said set of rollers to enable said platform to be moved freely along said first and said second track even when the spacing between said first and said second track varies;

a fold-up ladder, said fold-up ladder having a first position extending from said elevated platform to a floor level to permit a user to climb up said ladder and onto said elevated platform, said fold-up ladder having a second position to allow a user to move said ladder and said elevated platform to a second location; and a braking mechanism connected to said elevated platform, said braking mechanism including means to brake said elevated platform and prevent said elevated platform from moving when said braking mechanism is engaged so that a user can climb said ladder and remove a package from a storage shelf without having said elevated platform move along said pair of tracks.

2. The mobile overhead package retrieval device of claim 1 including a package platform to allow a user to lower packages from the elevated platform to floor level.

3. The mobile overhead package retrieval device of claim 1 including a lifter that assists a user in raising said fold-up ladder.

4. The mobile overhead package retrieval device of claim 1 wherein said elevated platform includes guard rails to prevent a worker from falling from said elevated platform.

5. The mobile overhead package retrieval device of claim 1 wherein said first and said second track each have a generally closed C-shape with an opening therein that has a dimension less than a diameter of said rollers so that said rollers remain captured in said first and said second track to thereby maintain said elevated platform between said first track and said second track.

6. The mobile overhead package retrieval device of claim 1 including a brake pedal for automatically engaging said fold-up ladder when said fold-up ladder is lowered to thereby engage said brake mechanism on said elevated platform.

7. The mobile overhead package retrieval device of claim 1 including a hand grip mounted on said fold-up ladder, said hand grip retractable to a stored position when said fold-up ladder is in a down position and extendable downward when said fold-up ladder is in an up position to enable a user to grasp said hand grip and pull said fold-up ladder from an up position to a down position.

8. The mobile overhead package retrieval device of claim 1 wherein said braking mechanism includes brake pads for engaging said first track to thereby prevent movement of said elevated platform.

9. The mobile overhead package retrieval device of claim 1 wherein said braking mechanism and said rollers are mounted on said platform.

10. The mobile overhead package retrieval device of claim 1 including locking casters on said fold-up ladder.

11. A mobile overhead package retrieval device to enable a user to move a retrieval platform from place to place along storage shelves to allow the user to safely retrieve packages from an overhead storage area on the storage shelves comprising:
- a pair of storage shelves for holding articles in a position above the normal reach of a person standing on a floor;
- means attached to said storage shelves for mounting a movable elevated platform thereon;
- an elevated platform for supporting a user off the floor as the user removes a package from an overhead shelf on said storage shelves, said elevated platform including further means to move said elevated platform freely along said means attached to said storage shelves for mounting a movable elevated platform to thereby enable a user to move said elevated platform to a location to permit the user to retrieve a package from the overhead shelf;
- means to elevate a user to said elevated platform from the floor; and
- a braking mechanism, said braking mechanism including means to brake said elevated platform and prevent said elevated platform from moving so that a user can remove a package from the overhead storage shelf without having the elevated platform move.

* * * * *